(12) United States Patent
Chen et al.

(10) Patent No.: US 7,075,062 B2
(45) Date of Patent: Jul. 11, 2006

(54) APPARATUS AND METHODS FOR DOWNHOLE DETERMINATION OF CHARACTERISTICS OF FORMATION FLUIDS

(75) Inventors: Felix Chen, Newtown, CT (US); Gary Corris, Newtown, CT (US); Oliver Mullins, Ridgefield, CT (US); Xu Wu, Beijing (CN); John Fitzgerald, Cambridge (GB); Anthony R. H. Goodwin, Thomaston, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 439 days.

(21) Appl. No.: 10/013,157

(22) Filed: Dec. 10, 2001

(65) Prior Publication Data

US 2003/0106993 A1    Jun. 12, 2003

(51) Int. Cl.
*G01V 5/08* (2006.01)
(52) U.S. Cl. .................................................. 250/269.1
(58) Field of Classification Search ........ 250/253–256, 250/264, 268, 269.1, 269.2, 269.3
See application file for complete search history.

(56) References Cited

U.S. PATENT DOCUMENTS

| | | | |
|---|---|---|---|
| 3,258,963 A | 7/1966 | Bryant et al. ................. 73/155 |
| 3,780,575 A | 12/1973 | Urbanosky ..................... 73/152 |
| 3,787,683 A * | 1/1974 | Kishel ........................ 250/308 |
| 3,859,851 A | 1/1975 | Uranosky ..................... 73/155 |
| 4,490,609 A * | 12/1984 | Chevalier ................. 250/269.1 |
| 4,520,267 A | 5/1985 | Sipila et al. .............. 250/358.1 |
| 4,994,671 A * | 2/1991 | Safinya et al. ............... 250/255 |
| 5,012,091 A | 4/1991 | Moake ........................ 250/266 |
| 5,266,800 A | 11/1993 | Mullins ....................... 250/256 |
| 5,331,156 A | 7/1994 | Hines et al. ................. 250/256 |
| 5,390,115 A | 2/1995 | Case et al. ................... 364/422 |
| 5,680,431 A | 10/1997 | Pietras, III et al. ......... 378/119 |
| 5,939,717 A | 8/1999 | Mullins ....................... 250/255 |
| 6,097,786 A * | 8/2000 | Groves et al. ................ 378/53 |
| 6,150,655 A | 11/2000 | Odom et al. ............. 250/269.6 |
| 6,389,908 B1 * | 5/2002 | Chevalier et al. ........ 73/861.63 |

FOREIGN PATENT DOCUMENTS

GB    2 381 862 A    5/2003

* cited by examiner

*Primary Examiner*—Frank G. Font
*Assistant Examiner*—James P. Hughes
(74) *Attorney, Agent, or Firm*—Vincent Loccisano; Jody Lynn DeStefanis; David P. Gordon (57) ABSTRACT

An oil sample is subjected to nuclear electromagnetic irradiation downhole, and the electron and/or mass density of the oil sample is determined by measuring the attenuation of the irradiation and relating the attenuation to the electron density. If the irradiation is high energy gamma ray irradiation, the attenuation is considered to be a function of Compton scattering only, which in turn is related to the electron density of the sample. If X-rays are utilized, attenuation is preferably measured in two energy windows. Using the two different attenuation values found in the different windows, the attenuation due to Compton scattering can be found and related to the electron and/or mass density of the sample. In addition, attenuation due to photoelectric absorption may also be determined and related to the presence of one or more heavy elements in the oil (e.g., sulfur) and/or sanding.

62 Claims, 6 Drawing Sheets

APPARATUS AND METHODS FOR DOWNHOLE DETERMINATION OF CHARACTERISTICS OF FORMATION FLUIDS

BACKGROUND OF THE INVENTION

1. Field of the Invention

The present invention relates to methods and apparatus for determining in situ the properties of oil. The present invention more particularly relates to methods and apparatus for determining oil characteristics such as mass or electron density and/or the presence of unwanted elements in the oil such as sulfur. The invention has particular application to both oilfield exploration and production, although it is not limited thereto.

2. State of the Art

Those skilled in the art will appreciate that the ability to conduct an analysis of formation fluids downhole (in situ) is extremely desirable for several reasons. First, the in situ formation fluid analysis can determine the economical value of the crude oil in the formation. Second, the analysis can permit monitoring of filtrate contamination in wells drilled with an oil based mud. Third, a proper downhole analysis permits the typing of oil in multiple producing zones. With that in mind, the assignee of this application has provided a commercially successful borehole tool, the MDT (a trademark of Schlumberger) which extracts and analyzes a flow stream of fluid from a formation in a manner substantially as set forth in co-owned U.S. Pat. Nos. 3,859,851 and 3,780,575 to Urbanosky which are hereby incorporated by reference herein in their entireties. The OFA (a trademark of Schlumberger), which is a module of the MDT, determines the identity of the fluids in the MDT flow stream and quantifies the oil and water content based on the previously incorporated related patents. In particular, U.S. Pat. No. 4,994,671 to Safinya et al., which is hereby incorporated by reference herein in its entirety provides a borehole apparatus which includes a testing chamber, means for directing a sample of fluid into the chamber, a light source preferably emitting near infrared rays and visible light, a spectral detector, a data base means, and a processing means. Fluids drawn from the formation into the testing chamber are analyzed by directing the light at the fluids, detecting the spectrum of the transmitted and/or backscattered light, and processing the information accordingly (and preferably based on the information in the data base relating to different spectra), in order to quantify the amount of water and oil in the fluid. As set forth U.S. Pat. No. 5,266,800 to Mullins which is hereby incorporated by reference herein in its entirety, by monitoring optical absorption spectrum of the fluid samples obtained over time, a determination can be made as to when a formation oil is being obtained as opposed to a mud filtrate. Thus, the formation oil can be properly analyzed and quantified by type. Further, as set forth in U.S. Pat. No. 5,331,156 to Hines et al., which is hereby incorporated by reference herein in its entirety, by making optical measurements of the fluid stream at certain predetermined energies, oil and water fractions of a two-phase fluid stream may be quantified.

As previously suggested, the measurement of fluid density is of great importance to the oil industry. Dead crude oil (i.e., oil at the formation surface and at ambient pressure) consists primarily of carbon and hydrogen with some contaminants or unwanted elements such as sulfur which constitute by weight a few percent of the oil. Generally, the economic value of the crude oil increases with its hydrogen content, as valuable fluids such as gasoline which are constituted of saturated hydrocarbons have an H to C ratio of approximately 2, whereas the least valuable component of crude oil, asphaltene, has an H to C ratio of approximately 1.1. Asphaltenes are primarily large aromatic molecules of considerable densities. Thus, in a crude oil, a high density is generally indicative of a high asphaltene content.

The presence of a large amount of asphaltenes in oil is undesirable from both a production viewpoint and from a processing viewpoint. In production, asphaltenes are known to plug oil wells. Asphaltenes are components of crude oil that are often found in colloidal suspension in the formation fluid. If for any reason the colloidal suspension becomes unstable, the colloidal particles will precipitate, stick together and, especially in circumstances where the asphaltenes include resins, plug the well. Asphaltene precipitation during production causes severe problems. Plugging of tubing and surface facilities disrupts production and adds cost. Plugging of the formation itself is very difficult and expensive to reverse, especially for a deep water well. In processing oil that has been produced, asphaltenes are likewise undesirable as catalytic cracking will yield some low-grade coke that is not a valuable commodity.

Currently, the stock tank density of crude oil is the primary determinant of the economic value of the crude oil. It is therefore desirable to oil producers to be able to determine what the stock tank density of oil located in a formation will be after it is produced. However, downhole determinations of oil density are often subject to inaccuracies. For example, it is common for crude oil to have methane gas dissolved in the oil. When produced, the methane gas separates out of the oil and must be disposed of properly. Thus, when methane gas is present, the methane gas increases the hydrogen content of the oil downhole (and decreases the density), which provides an inaccurate reflection of the stock tank density uphole.

While a downhole densitometer has been suggested by Pettetier, Michael T., et al. in patent publication WO/01/51898A1, the provided apparatus is subject to significant error. In particular, the suggested device includes two resonant cavities; one filled with the sample fluid, and the other filled with a known fluid. The sample fluid density is determined from the difference in resonant frequencies between the two cavities and the density of the known fluid. However, since the reference frequency of the known fluid is subject to change with temperature and pressure, significant errors are likely.

Terminology

For purposes of understanding the invention, the following parameters are used and are to be understood as follows:

| | |
|---|---|
| Avogadro's number | $N_0 = 6.023 \times 10^{23}$ (dimensionless) |
| Mass density | $\rho$ (g/cm$^3$) |
| Electron density | $n_e$ = # of electrons/cm$^3$ |
| Atomic number | Z = # of electrons per atom (dimensionless) |
| Atomic mass | A = the total mass of $N_0$ atoms with atomic number Z (g) |
| Number density | n = number of nuclei per unit volume cm$^{-3}$ |
| cross section | $\sigma$ (cm$^2$) |
| mass attenuation coefficient | $\mu_m = \dfrac{n \times \sigma}{\rho} = \dfrac{N_0}{A} \sigma$ (cm$^2$/g) |

SUMMARY OF THE INVENTION

It is therefore an object of the invention to provide methods for determining in situ the mass or electron density of a formation oil sample.

It is another object of the invention to provide methods for determining in situ the heavy element content of the oil.

It is a further object of the invention to provide apparatus for implementing the methods of the invention.

In accord with these objects, which will be discussed in detail below, a method of the invention comprises obtaining an oil sample downhole, subjecting the oil sample downhole to nuclear electromagnetic irradiation, and determining the mass and/or electron density of the oil sample by measuring the attenuation of the irradiation, and relating the attenuation to the mass and/or electron density. The nuclear electromagnetic radiation is preferably either high energy (e.g., >100 keV) gamma ray irradiation, or X-ray irradiation. Where high energy gamma rays are utilized, the attenuation is considered to be a function of Compton scattering only, which in turn is related to the electron density of the sample. Where X-rays are utilized, attenuation is preferably measured in two windows; e.g., a first relatively higher energy window (e.g., 50 keV–60 keV) where Compton scattering dominates and the effect of photoelectric absorption is relatively small, and a second relatively lower energy window (e.g., 20 keV–24 keV) where attenuation is a function of Compton scattering and photoelectric absorption, and their effects are nearly equal. Using the two different attenuation values found in the different windows, the attenuation due to Compton scattering can be found and related to the electron density of the sample. In both cases, the mass density can be found from the electron density.

It will be appreciated that when X-rays are utilized, attenuation due to photoelectric absorption may also be determined from the two equations. According to the invention, the photoelectric absorption may then be related to the presence of heavy elements in the oil (e.g., sulfur); i.e., the oil may be typed. Typing of the oil is useful where formation fluid samples are taken by the sampling tool and a decision must be made after the fluid sample is analyzed as to whether to discard the sample or to bring the sample to the surface. Thus, according to the invention, each time the oil type changes, it may be useful to keep the sample for analysis on the formation surface, as commingling of different types of oil during production can cause problems; e.g., asphaltene precipitation may occur when light and heavy oils are mixed. In addition, it is desirable in advance of production to know the amount of sulfur which may be present in the oil, as sulfur content above certain amounts must be removed from the oil in order to enhance the value of the oil.

According to one embodiment of the invention, in finding the stock tank oil density, account is taken of methane which is dissolved in the downhole oil. Using known techniques, the gas-oil ratio for the downhole oil is found, and that information is used in conjunction with the determination of the mass density of the downhole sample to provide a corrected density answer.

According to another embodiment of the invention, by monitoring the attenuation over a period of time as fluid is drawn into the sampling tool, periods of a sharp increase of attenuation due to sanding (i.e., the drawing of sand into the sampling tool) may be identified. The periods of sanding may then be removed from the oil density de terminations.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
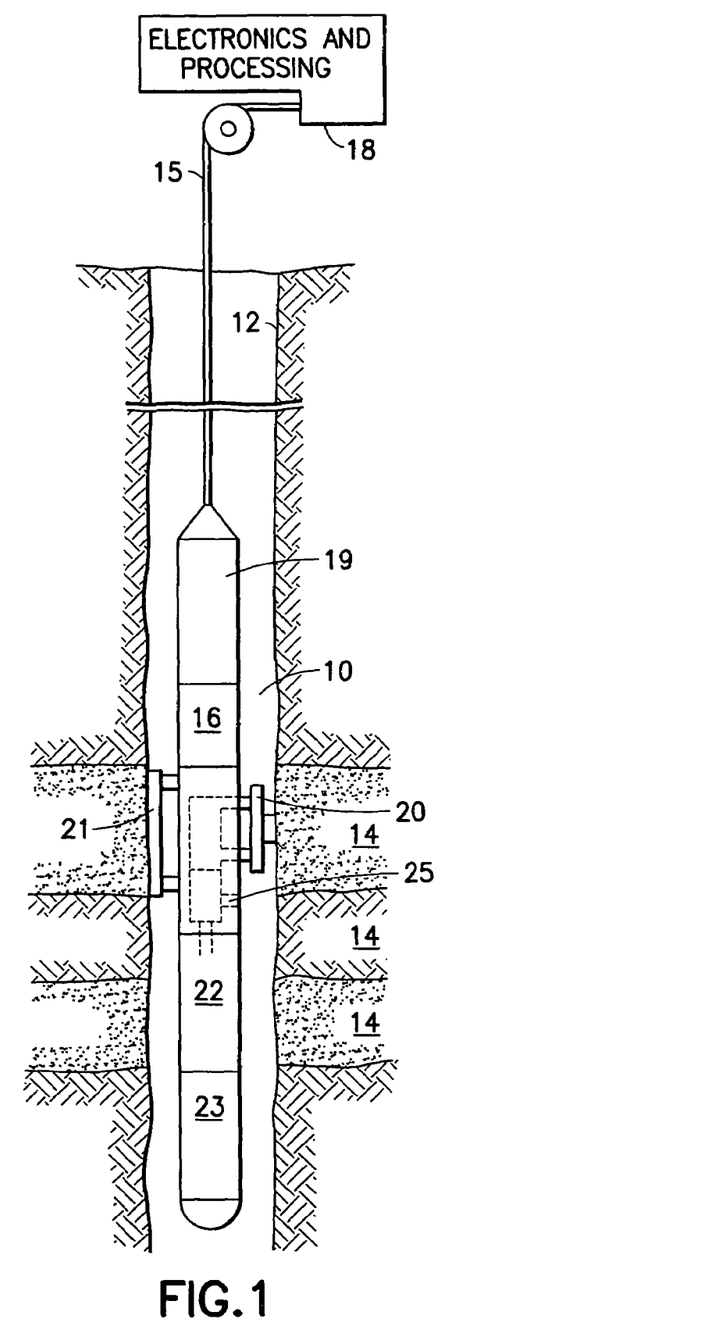
FIG. 1 is a schematic diagram of a borehole apparatus for analyzing formation fluids.

Referring now to FIG. 1, a borehole tool 10 for analyzing fluids from the formation 14 is suspended in the borehole 12 from the lower end of a typical multiconductor cable 15 that is spooled in a usual fashion on a suitable winch (not shown) on the formation surface. On the surface, the cable 15 is preferably electrically coupled to an electrical control system 18. The tool 10 includes an elongated body 19 which encloses the downhole portion of the tool control system 16. The elongated body 19 also carries a selectively extendable fluid admitting assembly 20 and a selectively extendable tool anchoring member 21 which are respectively arranged on opposite sides of the body. The fluid admitting assembly 20 is equipped for selectively sealing off or isolating selected portions of the wall of the borehole 12 such that pressure or fluid communication with the adjacent earth formation is established. Also included with tool 10 is a fluid analysis module 25 through which the obtained fluid flows. The fluid may thereafter be expelled through a port (not shown) or it may be sent to one or more fluid collecting chambers 22 and 23 which may receive and retain the fluids obtained from the formation. Control of the fluid admitting assembly, the fluid analysis section, and the flow path to the collecting chambers is maintained by the electrical control systems 16 and 18.

Additional details of methods and apparatus for obtaining formation fluid samples may be had by reference to U.S. Pat. Nos. 3,859,851 and 3,780,575 to Urbanosky, and U.S. Pat. No. 4,994,671 to Safinya et al. which are hereby incorporated by reference herein in their entireties. It should be appreciated, however, that it is not intended that the invention be limited to any particular method or apparatus for obtaining the formation fluids.

Figure 2:
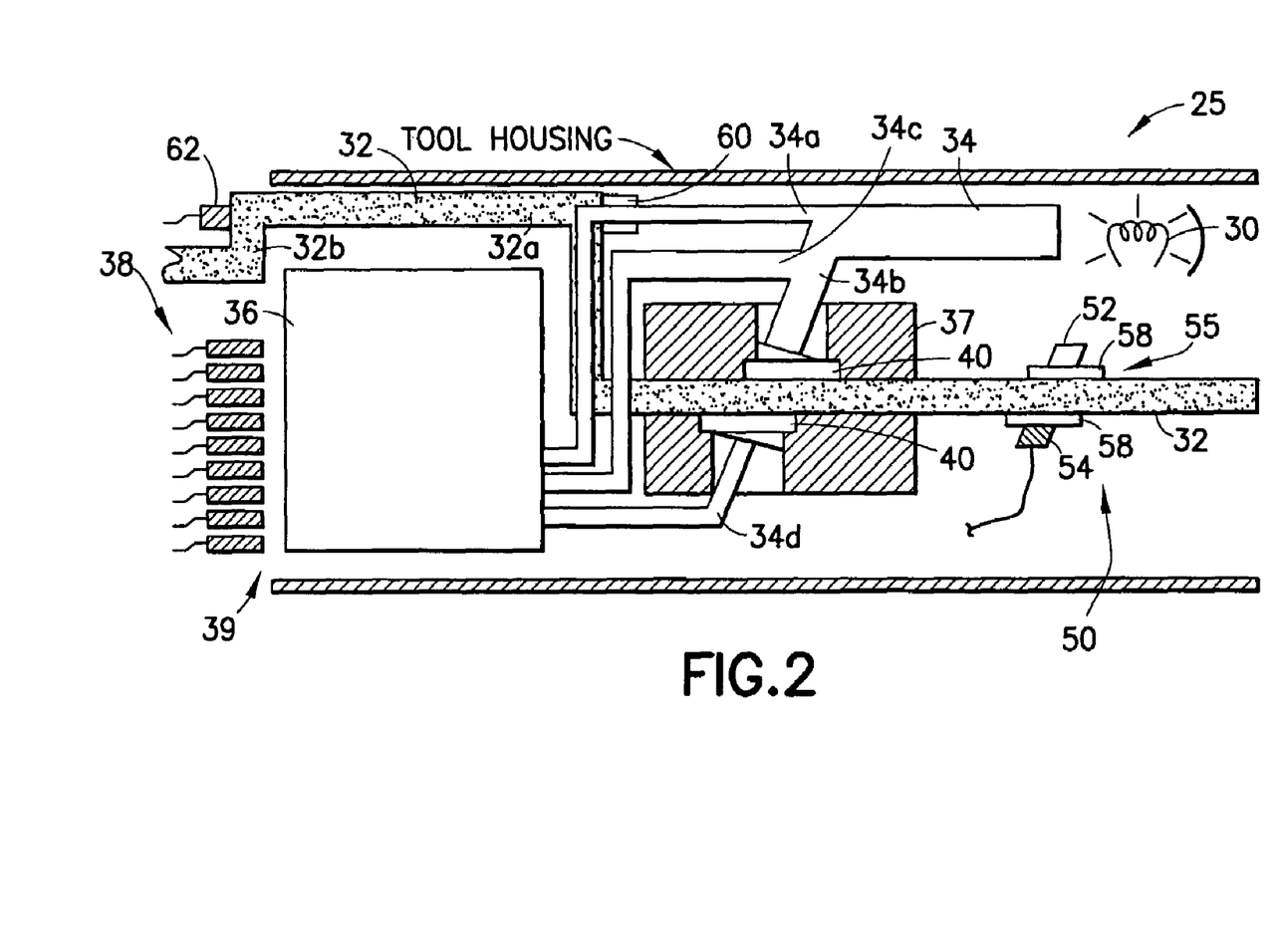
FIG. 2 is a schematic diagram of a fluid analysis module for use in the apparatus of FIG. 1.

Turning now to FIG. 2, the fluid analysis module 25 includes an optional optical system 29 and a nuclear electromagnetic radiation system 50. The optional optical system includes a light source 30, a fluid sample tube 32, optical fibers 34, and a filter spectrograph 39 which includes a fiber coupler or distributor 36 and an associated detector array 38. The light source 30 is preferably an incandescent tungsten-halogen lamp which is kept at near atmospheric pressure. The light source 30 is relatively bright throughout the near infrared wavelength region of 1 to 2.5 microns and down to approximately 0.5 microns, and has acceptable emissions from 0.35 to 0.5 microns. Light rays from the light source 30 are preferably transported from the source to the fluid sample by at least part of a fiber optic bundle 34. The fiber optic bundle 34 is preferably split into various sections. A first small section 34a goes directly from the light source 30 to the distributor 36 and is used to sample the light source. A second section 34b is directed into an optical cell 37 through which the sample tube 32 runs and is used to illuminate the fluid sample. A third bundle 34d collects light transmitted or scattered through the fluid sample and provides the filter spectrograph with the light for determining the absorption spectrum of the fluid sample. Optionally, though not necessarily preferred, a fourth fiber optic bundle 34c collects light substantially backscattered from the sample for spectrographic analysis. The backscattered spectrum may be useful if multiple phases are present simultaneously. A three position solenoid (not shown) is used to select which fiber optic bundle is directed toward the filter spectrograph 39. Preferably, a light chopper (not shown) modulates the light directed at the spectrograph at 500 Hz to avoid low frequency noise in the detectors.

As mentioned above, optical bundle 34b directs the light towards the fluid sample. The fluid sample is obtained from the formation by the fluid admitting assembly and is sent to the fluid analysis section 25 in tube 32. The sample tube 32 is preferably a two by six millimeter rectangular stainless steel channel which includes a section 40 with windows made of sapphire (and as discussed below a section 55 with windows made of a low-Z material such as beryllium). This window section 40 is located in the optical cell 37 where the light rays are arranged to illuminate the sample. Sapphire is chosen for the windows because it is substantially transparent to the spectrum of the preferred light source. and because it is highly resistant to abrasion. As indicated schematically in FIG. 2, the window areas 40 may be relatively thick compared to the rest of the tube 32 to withstand high internal pressure. The fiber optic bundles 34b and 34d are preferably not perpendicular to the window areas 40 so as to avoid specular reflection. The window areas are slightly offset as shown in FIG. 2a to keep them centered in the path of the transmitted light. The signals from the detectors are digitized, multiplexed, and transmitted uphole via the cable 15 to the processing electronics 18 shown in FIG. 1.

Those skilled in the art will appreciate that each element in the detector array 38 is provided with a band pass filter for a particular wavelength band. According to a presently preferred embodiment, the detector array has ten elements which detect light at or about the following wavenumbers: 21000 cm−1, 18600 cm−1, 15450 cm−1, 9350 cm−1, 7750 cm−1, 6920 cm−1, 6250 cm−1, 6000 cm−1, 5800 cm−1, and 5180 cm−1. It will be appreciated that the first three wavenumbers represent visible blue, green, and red light and are preferably used to perform the type of analysis described in previously incorporated U.S. Pat. No. 5,266,800. The remaining wavenumbers are in the NIR spectrum and at least some are used to perform analyses such as a gas-oil ratio (GOR) analysis as described in U.S. Pat. No. 5,939,717 to Mullins which is hereby incorporated by reference herein in its entirety.

The nuclear electromagnetic radiation system 50 of FIG. 2 includes either a continuous Bremsstrahlung X-ray source 52 such as the one described in U.S. Pat. No. 5,680,431 to J. S. Pietras, and an X-ray detector 54 which are located adjacent the section 55 of the sample tube 32 containing the low-Z material windows 58, and/or a gamma-ray source 60 and gamma-ray detector 62. The X-ray beam generated by the X-ray source is preferably oriented at a forty-five degree angle relative to the sample tube 32 to increase the path length in the fluid, and hence, the measurement sensitivity.

The X-ray source preferably generates a continuous spectrum of X-rays up to an energy of about 60 keV. The X-ray detector may constitute a scintillator (such as a NaI crystal), or a layered detector arrangement including a front detector which is sensitive mainly to lower energy photons (e.g., 20 keV–24 keV), and a rear detector that absorbs substantially all photons that pass through the front detector. Since most low-energy photons are absorbed in the front detector, the rear detector absorbs mainly high-energy photons (e.g., 50 keV–60 keV). Regardless of the form that the X-ray detector takes, it is desirable that the X-ray detector be able to distinguish between and count photons in at least two different energy windows. The gamma-ray source 60 is preferably an "exempt" source such as a 10 µCi cesium or Na22 source which produces gamma rays having energies on the order of several hundred keV. The gamma-ray detector 62 is preferably a NaI scintillator. The gamma-ray source 60 and detector 62 are preferably located adjacent jogs 32a, 32b in the sample tube 32 so that source and detector may be located adjacent the tube and a length, e.g., of approximately four inches of the tube is investigated by the gamma-ray system. No window in the tube 32 is required in conjunction with the gamma-ray system as the high energy gamma-rays can readily penetrate the sample tube wall. If desired, a gamma-ray shield (not shown) can be located adjacent the sample tube to prevent stray gamma-rays from affecting other instrumentation.

As will become more evident hereinafter, while FIG. 2 is shown with both an X-ray and gamma-ray source and detector, only one nuclear electromagnetic system (X-ray or gamma-ray) is required to practice certain aspects of the invention. Likewise, as will become evident, while useful in certain embodiments of the invention, the optional optical system is not required to practice the invention.

According to the invention, information obtained from the nuclear electromagnetic system is used in determining the electron and/or mass density of the oil sample contained in the sample tube 32. In particular, as a nuclear electromagnetic beam passes through a medium, it interacts with electrons and its intensity is attenuated. For a tightly focused beam, the attenuation is characterized by the medium's mass attenuation coefficient $\mu_m(E)$ according to:

$$I(E) = I_0(E) e^{-\mu_m(E) \times \rho \times l} \tag{1}$$

where $I_0(E)$ and $I(E)$ are respectively photon energy spectra before and after the beam passes through a medium of thickness or path length l, and ρ is the mass density of the medium. The density sensitivity S of the measurement is the ratio of the percentage change in I to the percentage change in ρ:

$$S = \frac{dI/I}{d\rho/\rho} = -\mu_m(E) \times \rho \times l \tag{2}$$

For a given density precision, a low sensitivity requires a high measurement precision.

The total mass attenuation coefficient $\mu_m$ can be expressed in terms of the mass attenuation coefficient $\mu_{m,i}$ and weight fractions w of individual components (i) in the medium according to:

$$\mu_m(E) = \Sigma \mu_{m,i}(E) w_i \tag{3}$$

Generally, there are four mechanisms which govern the interaction between nuclear electromagnetic radiation and a sample through which the radiation is directed: Compton scattering, photoelectric absorption, coherent scattering, and pair production. The threshold photon energy for pair production is large; i.e., about 1022 keV. Coherent scattering, on the other hand, is important mainly for relatively low energy photons (e.g., below 10 keV) scattered off heavy atoms. Thus, for purposes of the present invention, where gamma rays or X-rays are being generated downhole to explore the content of oil samples, the Compton scattering and photoelectric effect are of primary interest, as the energies produced are typically between 10 keV and several hundred keV.

Photoelectric absorptions and Compton scatterings exhibit very different energy and atomic number dependencies. Those differences are better illustrated in terms of microscopic cross sections rather than mass attenuation coefficients. The mass attenuation coefficient in equation (3) can be expressed in terms of the elemental cross sections according to:

$$\mu_m(E) = \sum \mu_{m,i}(E) w_i = \frac{1}{\rho} \sum n_i \sigma_i(E) \quad (3.1)$$

where $n_i$ is the number density, and $\sigma_i(E)$ is the total cross section per atom of the i'th element. For each element of the oil medium, the cross section $\sigma_i(E)$ can be separated into its Compton scattering and photoelectric absorption components:

$$\sigma(E) = \sigma_{C,i}(E) + \sigma_{Pe,i}(E) \quad (4)$$

If follows that:

$$\mu_m(E) = \mu_{m,Pe}(E) = \frac{1}{\rho} \sum n_i \sigma_{C,i}(E) + \frac{1}{\rho} \sum n_i \sigma_{Pe,i}(E) \quad (4.1)$$

For a photon energy far away from the absorption edges, it has been shown (e.g., W. Heitler, The Quantum Theory of Radiation, Oxford Univ. Press, 1954) that the cross section for ejecting one electron from the K-shell is $$\Xi_{Pe,K,i}(E) = \sigma_T (mc^2)^{3.5} \frac{2\sqrt{2}}{137} \frac{Z_i^5}{E^{3.5}} \quad (4.2)$$

where $\sigma_T = 6.568 \times 10^{-25}$ cm$^2$ is the classical Thomas cross section, and mc$^2$ is the rest energy of the electron (511 keV). The photoelectric absorption per atom is the sum of cross sections of ejecting electrons from all shells. However, ejection is less probable from higher shells because of the screening of the nuclear charge. Thus, $\sigma_{Pe,i}(E)$ is dominated by the K-shell ejection and accordingly $$\sigma_{Pe,i}(E) \approx \Xi_{Pe,K,i} \quad (4.3)$$

The mass attenuation due to photoelectric absorption can therefore be expressed according to $$\mu_{m,Pe}(E) = \frac{1}{\rho} \sum n_i \sigma_{Pe,i}(E) = \frac{1}{\rho} \sum \frac{N_0 \rho_i}{A_i} \times \sigma_{Pe,i}(E) = \frac{a}{E^{3.5}} \sum \frac{w_i Z_i^5}{A_i} \quad (5)$$

where $N_0$ is the Avogadro's number (6.023×10$^{23}$), a≈$N_0 \sigma_T$ (mc$^2$)$^{3.5}$ 2$\sqrt{2}$/137 is a constant, and $\rho_i$ and $A_i$ are the density and atomic mass of the i'th element.

For a photon energy E much larger than the binding energies of all electrons in the medium, the Compton scattering cross section per electron is given by the Klein-Nishina formula:

$$\Xi_C(E) = \sigma_T f_{KN}(E) \approx \sigma_T \times \left(1 - 2\gamma + \frac{26}{5}\gamma^2 + \ldots\right) \text{ for } \gamma \ll 1 \quad (5.1)$$

where $\gamma = mc^2$ is the relativistic factor. Since there are $Z_i$ electrons per atom, the Compton cross section per atom, $\sigma_{C,i}$ is:

$$\sigma_{C,i}(E) = Z_i \times \Xi_C(E) = Z_i \times \sigma_T \times f_{KN}(E) \quad (5.2)$$

The function $f_{KN}(E)$ decreases with E but at a much slower rate than $\sigma_{Pe}$. The mass attenuation due to Compton scattering can therefore be expressed according to:

$$\mu_{m,C}(E) = \frac{1}{\rho} \sum n_i \sigma_{C,i}(E) = \frac{1}{\rho} \sum \frac{N_0 \rho_i}{A_i} \times \sigma_{C,i}(E) = N_0 \sigma_T f_{KN}(E) \sum \frac{w_i Z_i}{A_i} \quad (6)$$

Alternatively, $\mu_m,C(E)$ can also be expressed in terms of electron density according to:

$$\mu_{m,C}(E) = \frac{1}{\rho} \sum n_i \sigma_{C,i}(E) = \frac{1}{\rho} f_{KN}(E) \sigma_T \sum n_i \times Z_i = \frac{n_e}{\rho} f_{KN}(E) \sigma_T = \frac{n_e}{\rho} \Xi_C(E) \quad (6.1)$$

where $n_e$ is the electron density of the medium.

Evaluation of equations (5) and (6) suggests that Compton scattering will dominate the total cross section at higher energies, while Pe absorption will dominate at lower energies. The transition from Pe absorption domination to Compton scattering domination depends on the atomic number Z of the element. In addition, as suggested by equation (5), the Pe cross section increases rapidly with Z. Thus, the Pe cross section is a very sensitive indicator for the presence of non-hydrocarbon elements (i.e., "contaminants" such as sulfur) in the oil sample. Both of these results can be seen in the following Table 1 which lists coherent, Compton, and the Pe attenuation coefficients as a function of energy for H, C and S in units of cm$^2$/g:

TABLE 1

| | (cm$^2$/g) | | | |
|---|---|---|---|---|
| E(keV) | Coh scatter | Compton | Photoelectric | Total |
| H | | | | |
| 10 | 2.46E−02 | 3.85E−01 | 2.63E−03 | 3.85E−01 |
| 20 | 6.68E−03 | 3.63E−01 | 2.41E−04 | 3.69E−01 |
| 30 | 3.02E−03 | 3.54E−01 | 5.99E−05 | 3.57E−01 |
| 40 | 1.71E−03 | 3.44E−01 | 2.24E−05 | 3.46E−01 |
| 50 | 1.10E−03 | 3.34E−01 | 1.05E−05 | 3.36E−01 |
| 60 | 7.65E−04 | 3.25E−01 | 5.66E−06 | 3.26E−01 |

TABLE 1-continued

| | (cm²/g) | | | |
|---|---|---|---|---|
| E(keV) | Coh scatter | Compton | Photoelectric | Total |
| C | | | | |
| 10 | 1.63E-01 | 1.36E-01 | 1.89E+00 | 2.19E+00 |
| 20 | 6.49E-02 | 1.60E-01 | 1.87E-01 | 4.12E-01 |
| 30 | 3.37E-02 | 1.66E-01 | 4.78E-02 | 2.47E-01 |
| 40 | 2.05E-02 | 1.65E-01 | 1.82E-02 | 2.04E-01 |
| 50 | 1.37E-02 | 1.63E-01 | 8.65E-03 | 1.85E-01 |
| 60 | 9.81E-03 | 1.60E-01 | 4.72E-03 | 1.74E-01 |
| S | | | | |
| 10 | 7.21E-01 | 1.06E-01 | 4.85E+01 | 4.93E+01 |
| 20 | 2.81E-01 | 1.38E-01 | 6.02E+00 | 6.44E+00 |
| 30 | 1.51E-01 | 1.49E-01 | 1.72E+00 | 2.02E+00 |
| 40 | 9.51E-02 | 1.52E-01 | 7.02E-01 | 9.49E-01 |
| 50 | 6.56E-02 | 1.53E-01 | 3.49E-01 | 5.68E-01 |
| 60 | 4.78E-02 | 1.52E-01 | 1.97E-01 | 3.97E-01 |

Figure 3:
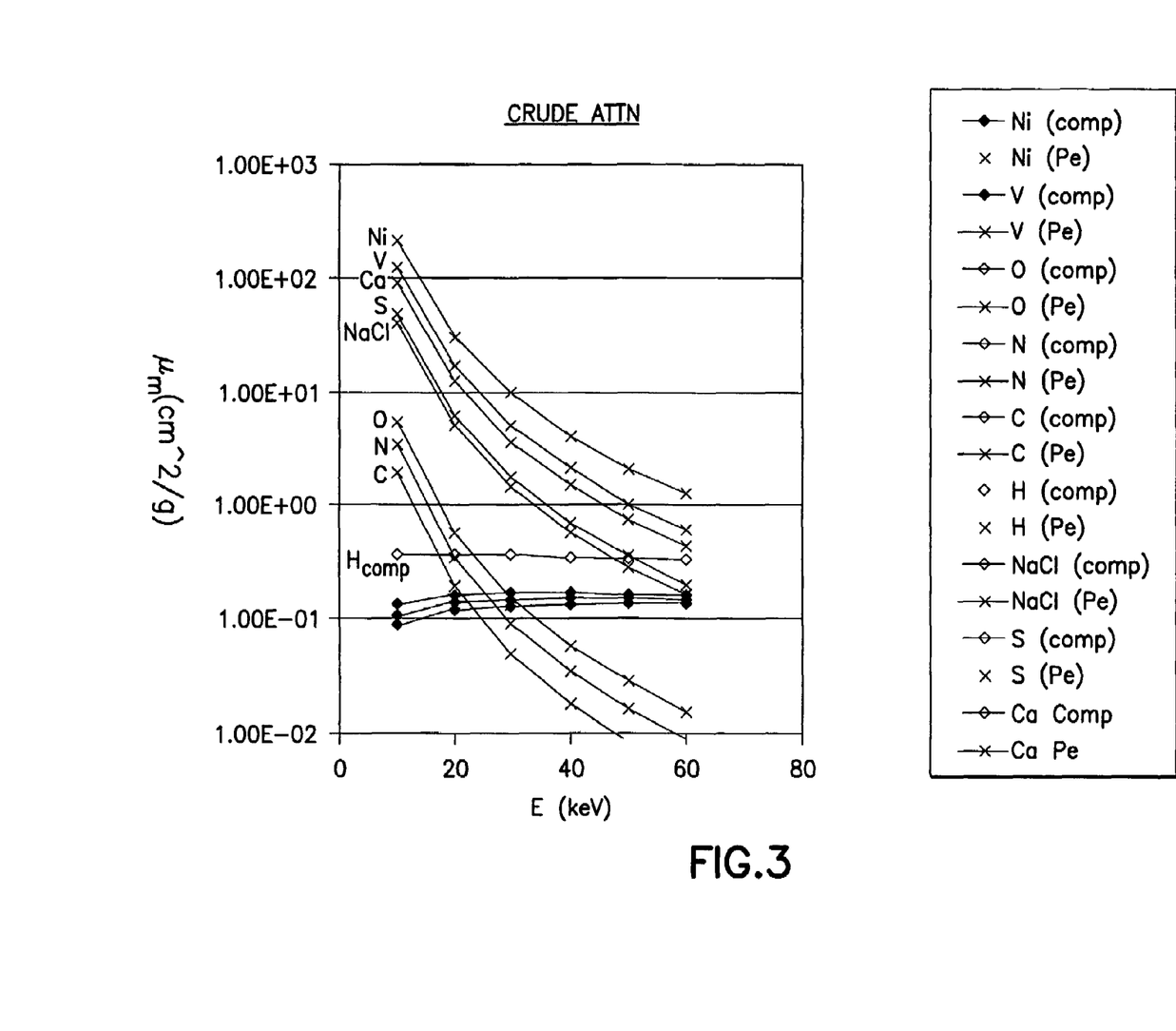
FIG. 3 is a graph of the Compton scattering and Pe absorption mass attenuation coefficients as a function of energy of elements commonly found in crude oils.
Figure 4:
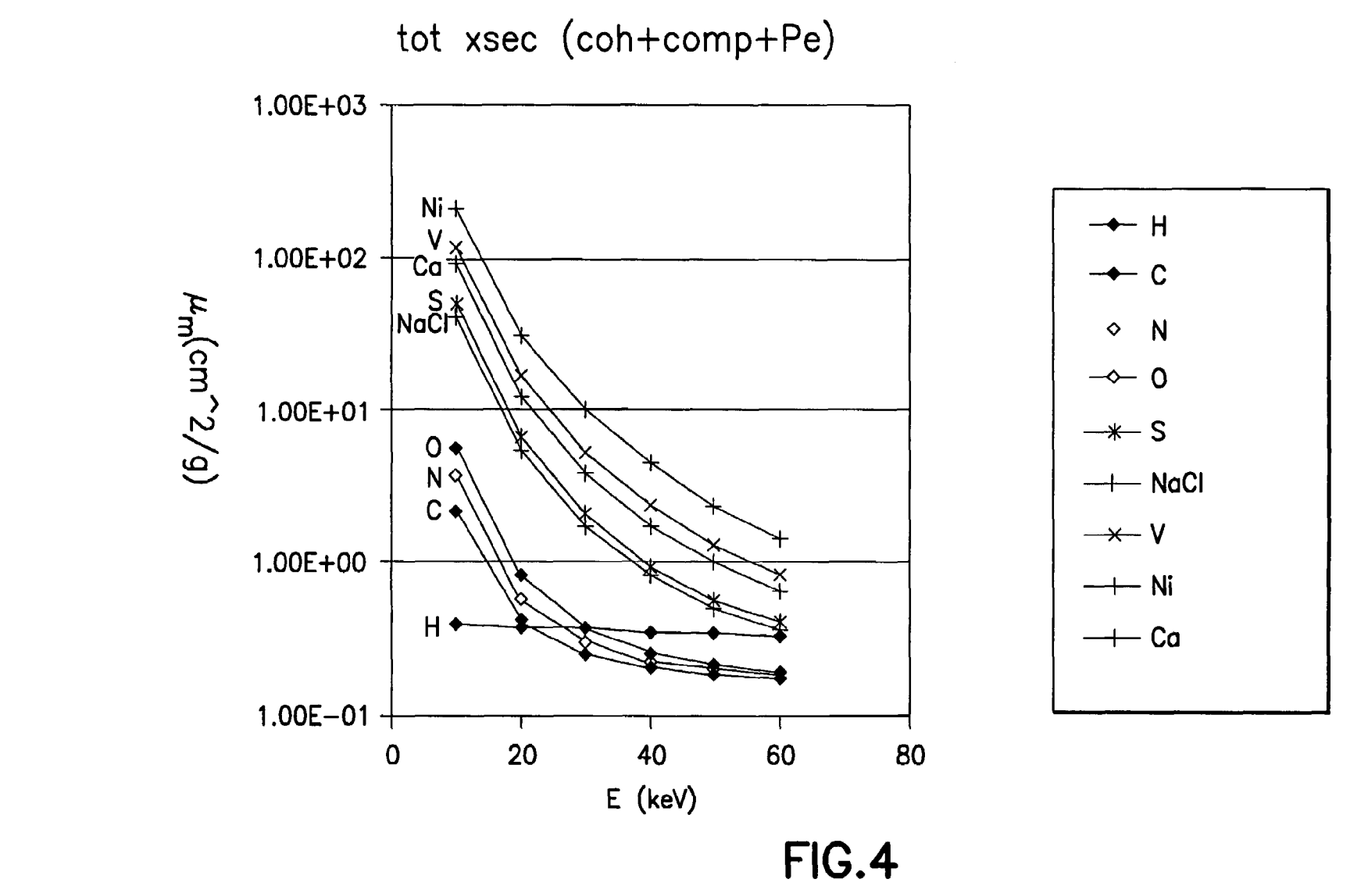
FIG. 4 is a graph of the total mass attenuation coefficients as a function of energy of elements commonly found in crude oils.

A graph of Compton scattering and Pe attenuation coefficients of H, C, S, and other elements commonly found in crude oils as a function of energy is seen in FIG. 3. A graph of the total mass attenuation coefficients of the elements shown in FIG. 3 as a function of energy is seen in FIG. 4. As can be seen from FIG. 4, the total mass attenuation coefficients of carbon and hydrogen are equal at about 22 keV. Also, as can be seen from FIG. 3, the mass attenuation coefficient of carbon due to Compton scattering and due to photoelectric absorption are likewise roughly equal at 22 keV. Further, as seen from FIG. 3 (and Table 1), the mass attenuation coefficient of any element due to Compton scattering is roughly constant in the 10 keV to 60 keV range, while the mass attenuation coefficients of all elements other than hydrogen change significantly over that range.

It is of particular note that the Compton mass attenuation coefficient of hydrogen is a factor of two greater than other elements, as shown in FIG. 3 and Table 1. This is because the Compton scattering in a sample directly measures the electron density rather than the mass density of the sample.

Returning to FIG. 2, it will be appreciated that where a gamma-ray source 60 and detector 62 are utilized, the attenuating cross section of the sample is dominated by Compton scattering (i.e., $\sigma=\sigma_{C,i}$) because the gamma-ray source has a typical energy of several hundred keV (e.g., 622 keV for $Cs^{137}$ and 511 keV for $Na^{22}$). Thus, the ratio of the measured intensity to the known intensity of the gamma-ray source ($I/I_0$) is a direct measure of electron density according to equation (1) above. According to the invention, the intensity $I_0$ of the gamma-ray source 60 is preferably measured uphole and known. The intensity I after the beam has traversed the fluid path is measured. The path length l is known. Because the attenuation is assumed to be due to Compton scattering only, the cross section per electron $\Xi_C(E)=\sigma_T f_{KN}(E)$ at the gamma-ray energy is taken to be a known constant (e.g., $\Xi_C(E)=2.533\times10^{-25}$ cm² at 622 keV). With I, $I_0$, path length l, and $\Xi_C$ known, the electron density $n_e$ is then found from the following expression:

$$\ln\left(\frac{I_0}{I}\right) = \mu_m \times \rho \times l = n_e \times \Xi_C \times l \quad (6.2)$$

If desired, the mass density ρ may then be found from the electron density via the following relationship:

$$\rho = \sum n_i \times \frac{A_i}{N_0} = \sum \left(\frac{n_i Z_i}{N_0} \times \frac{A_i}{Z_i}\right) = \frac{2}{N_0}\sum n_i Z_i - \frac{n_H}{n_0} \approx \frac{2\times n_e}{N_0} - \rho_H \quad (6.3)$$

where $\rho_H=n_H/N_0$ is the hydrogen mass density. Alternatively, by combining equations (6.2) and (6.3), the mass density may be found directly without the intermediate step of finding the electron density. Regardless, since hydrogen is much lighter than any other element, $\rho_H$ is much smaller than μ. If the hydrogen content of the sample is known, the electron density to mass density conversion can be conducted more accurately as discussed hereinafter.

Where the X-ray source 50 and detector 52 are utilized, the attenuation is not completely dominated by either Compton scattering or by the photoelectric effect. Thus, according to one preferred embodiment of the invention, the X-ray attenuation is preferably measured in two different energy windows; e.g., a first relatively higher energy window (e.g., 50 keV–60 keV) where Compton scattering dominates the carbon cross section, and a second relatively lower energy window (e.g., 20 keV–24 keV) where attenuation is a function of Compton scattering and photoelectric absorption (i.e., their effect is of the same order of magnitude). Using the two different attenuation values for the two different energies (E1 and E2), the Compton scattering cross section can be found as follows. First, knowing the source intensity as a function of energy $I_0(E)$, the measured intensity as a function of energy I(E), and the length of the path 1, using equation (1) above, measured quantities M (where $M=-\log(I/I_0)/l$ at energies E1 and E2 may be expressed as $$M(E_1)=\mu_m(E_1)\times\rho \quad (7a)$$

$$M(E_2)=\mu_m(E_2)\times\rho \quad (7b)$$

Combining equations (4) and (5) and (6) yields $$\mu_m \times \rho = \quad (8)$$
$$(\mu_{m,Pe}+\mu_{m,C})\times\rho = \left[\frac{a}{E^{3.5}}\sum\frac{w_i Z_i^5}{A_i} + N_0\sigma_T f_{KN}(E)\sum\frac{w_i Z_i}{A_i}\right]\times\rho =$$
$$A\times\frac{1}{E^{3.5}} + B\times f_{KN}(E)$$

where $$A = \rho\times a\times\sum\frac{w_i Z_i^5}{A_i}, \quad (9)$$

$$B = \rho N_0 \sigma_T \times \sum\frac{w_i Z_i}{A_i} = \frac{1}{2}\rho N_0 \sigma_T(1+w_H), \quad (10)$$

and $w_H=\rho_H/\rho$ is the hydrogen weight fraction.

From equations (7.1), (7.2), and (8)

$$M(E_1) = A\times\frac{1}{E_1^{3.5}} + B\times f_{KN}(E_1) \quad (11a)$$

$$M(E_2) = A\times\frac{1}{E_2^{3.5}} + B\times f_{KN}(E_2) \quad (11b)$$

From the intensity measurements I(E) and the resulting determinations of $M(E_1)$ and $M(E_2)$, and using simultaneous equations (11a) and (11b), one skilled in the art can solve for A and B. From a determination of B, the mass density is determined according to $$\rho = \frac{2B}{N_0 \sigma_T (1 + w_H)} \quad (12)$$

It should be appreciated that in solving equations (11a) and (11b), the unknown A, which is related to the photoelectric absorption, is also easily determined. As suggested by equation (9), the Pe factor $$Pe = \frac{A}{\rho} = a \times \sum \frac{w_i Z_i^5}{A_i} \cong \frac{a}{2} \sum w_i Z_i^4 \quad (12.1)$$

Thus, according to the invention, the photoelectric absorption may be related to the presence of heavy elements in the oil (e.g., sulfur) as the Pe factor varies according to $Z^4$; i.e., the oil may be typed.

It should further be appreciated that there are other standard techniques to extract the mass density and the Pe factor from the responses of the two different energy windows. The procedure outlined above as represented by equations (4)–(12.1) is meant to illustrate the basic relationships between the measured quantities and the physical parameters of the investigated samples. Those relationships generally outline the interpretation framework, but are subject to some error. For example, equation (5) ignores all electron ejections from upper shells and is otherwise exact only if the photon energy is far away from the K-edge. Also, the Compton attenuation as represented by equation (6) ignores all electron binding energies. Thus, for more precise determinations of $\rho$ and Pe, it is desirable to calibrate the apparatus with samples of known properties. Interpretation may then be based on the assumption that the two measurements are linear combinations of Compton scattering and photoelectric absorption with different energy dependencies:

$$M(E_1) = Pe \times \rho \times F_{Pe}(E_1) + \rho \times (1+w_H) F_C(E_1) \quad (12.2)$$

$$M(E_2) = Pe \times \rho \times F_{Pe}(E_2) + \rho \times (1+w_H) F_C(E_2) \quad (12.3)$$

By measuring $M(E_1)$ and $M(E_2)$ for a number of samples of known Pe, $\rho$, and $w_H$, both $F_{Pe}$ and $F_C$ can be evaluated. Within the energy range of interest $F_C(E_1)$ is approximately equal to $F_C(E_2)$. Once $F_{Pe}$ and $F_C$ are known, the apparatus is calibrated and may be used to measure $\rho$ and Pe of unknown samples.

Figure 5:
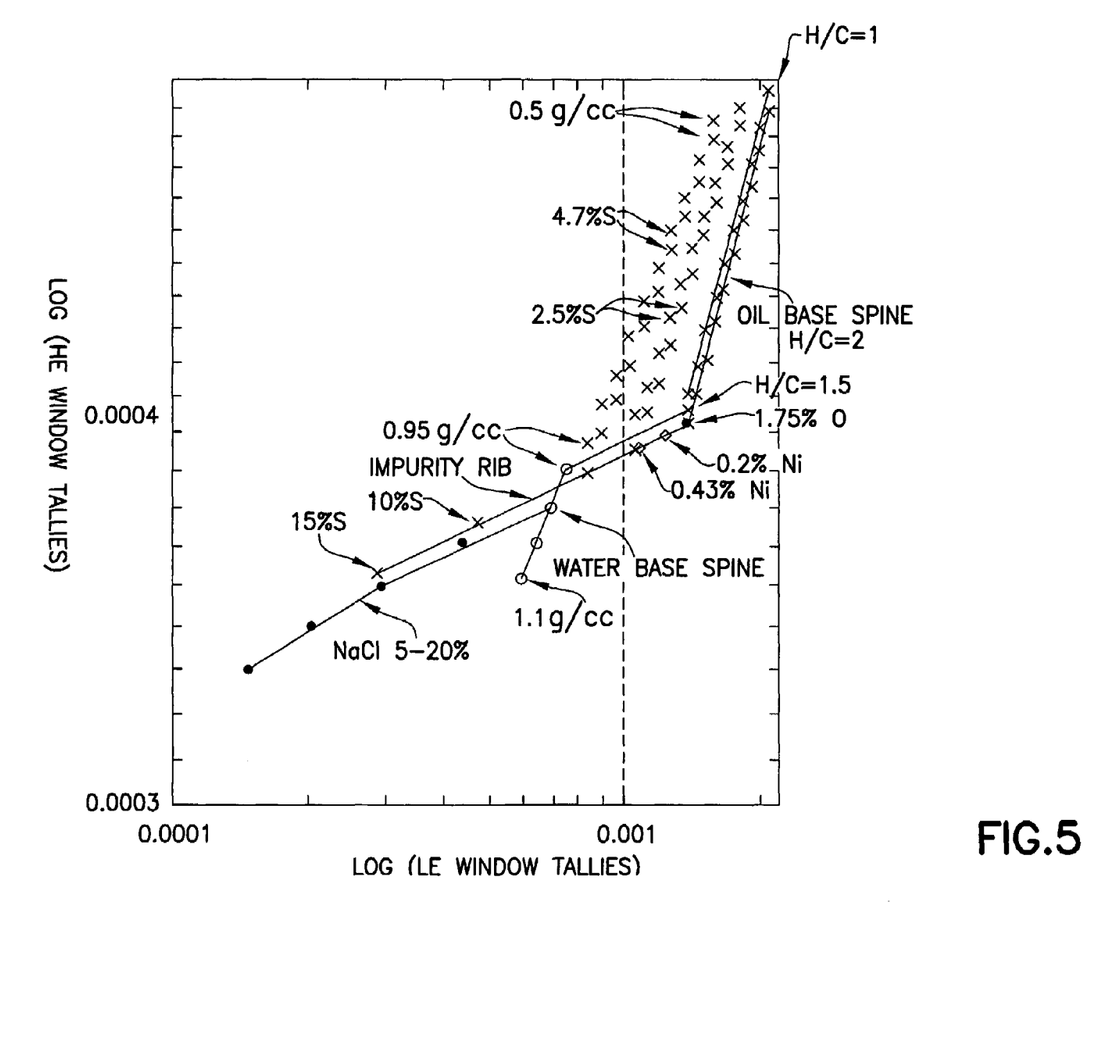
FIG. 5 is a cross-plot in two energy windows of responses of different oils.

More particularly, and as seen in FIG. 5, the intensities of X-rays detected in two energy windows after irradiating different oil mixtures (with and without impurities), and water, are plotted. The high energy (HE) window in FIG. 5 is a window of 50 keV–60 keV while the low energy (LE) window is a window from 20 keV–24 keV. Any given sample can be characterized by its density and composition (Pe). Because the Z/A ratio of hydrogen differs from those of other elements, compositional variations involving hydrogen also behave differently. The hydrogen content can be specified either by its weight fraction $w_H$ or by the H/C ratio (number of hydrogen atoms divided by the number of carbon atoms). Using the latter characterization is often more convenient because H/C is an important petroleum parameter. As can be seen in FIG. 5, relatively straight lines (marked "oil base spine" and "water base spine") are generated from points of a constant composition (constant Pe and H/C) but of a changed density (from 0.5 g/cc to 0.95 g/cc in 0.05 g/cc steps). The spines are straight lines because attenuations in both the low-energy and the high-energy windows are proportional to the mass density $\rho$. The composition of a base spine is either pure water or hydrocarbons. There is only one water base spine but many oil base spines with different H/C ratios. Points with different H/C but the same density are displaced from each other vertically (i.e., at a constant density, the attenuation in the high-energy window increases with H/C ratio whereas the attenuation in the low-energy window remains unchanged), reflecting the fact that in the low energy window equal masses of hydrogen and carbon have the same attenuation effect.

While the change in H/C ratio at a constant density causes a vertical displacement, the addition of other impurities at a constant density (i.e., compositional changes) in the oil or water generates displacements along "impurity ribs" in the cross plot of FIG. 5 Since every point on an impurity rib has the same density (the same Compton scattering), the displacements between different points are the results of different Pe factors. Impurity ribs are also generally straight lines because both $M(E_1)$ and $M(E_2)$ are linear in Pe. Because the photoelectric absorption is less important in the high-energy window than in the low-energy window, the rib angles (i.e., the angles between the ribs and x-axis) are generally quite small. Rib angles decrease slightly with density as attenuation due to Compton scattering, which contributes the same amount to both $M(E_1)$ and $M(E_2)$, becomes larger. Interestingly, the water point at a density of 0.95 g/cc falls on the impurity rib for $CH_{1.5}$ of the same density, suggesting that the water may be treated in a similar way as other impurities even though it is much lighter.

Stated in another way, points on a spine all have the same elemental composition (the same Pe and H/C) but different densities $\rho$, while points on a rib have the same density and H/C but different Pe. Two different fluids with the same density and H/C ratio but different impurity compositions fall on the same point on the rib if they have the same Pe factor. For example, because nickel (Ni) is heavier and has a stronger Pe absorption than sulfur (S), 0.43% Ni produces nearly the same displacement on the rib as 2.5% S. That is, they generate the same Pe absorption and Compton scattering, and therefore produce the same measurements $M(E_1)$ and $M(E_2)$.

The spine and rib interpretation is equivalent to expressing the data in $(\rho, \mu_m)$ space. Since the oil sample broadly contains four components (H, C, O, and impurities I), there are three compositional variables: $w_I$, $R_H$, and $R_O$, where $w_I$ is the weight fraction of the impurities, $R_H$ is the ratio of the weight fraction of hydrogen to the weight fraction of carbon, and $R_O$ is the ratio of the weight fraction of oxygen to the weight fraction of carbon. Since $R_H$ can be assigned to be 1.5 (leading to at most a small ±3% inaccuracy in density), and since $R_O$ is usually known (as oxygen is mainly associated with water or $CO_2$ and the amount of water and/or $CO_2$ is derived from optical measurements), then the $R_H$ and $R_O$ can define the base spine for the base fluid mixture that consists of H, C, and O, but no impurities. The third variable $w_I$ defines the impurity rib. The length of the impurity rib from a measured point to the base spine is a function of the impurity content of the sample. If the base spine of the sample is known, then the Pe information may also be obtained. In this manner, the oil sample is "typed". Typing of the oil is useful where formation fluid samples are taken by the sampling tool and a decision must be made after the fluid sample is analyzed as to whether to discard the sample or to bring the sample to the surface. Thus, according to the invention, each time the oil type changes, it may be useful to keep the sample for analysis on the formation surface, as commingling of different types of oil during production can cause problems such as asphaltene precipitation. In addition, it is desirable in advance of production to know the amount of impurities (usually primarily sulfur) which may be present in the oil, as the sulfur is desirably removed from the oil.

Because the impurities (other than oxygen) are lumped together and are primarily designated "sulfur", the system may be said to be "under-defined" with respect to a determination of impurities. However, by obtaining other information regarding possible impurities, those skilled in the art will appreciate that it is possible to distinguish amongst and quantify the amounts of impurities in the oil sample.

The spine and ribs approach provides a convenient tool for visualizing changes in the fluid composition over time. Successive measurements made during pumping can fall on different points on the cross-plot. The displacement between any two measurements can be broken down into a change in density and a change in cross-section; i.e., $\rho'=\rho+\Delta\rho$ and $\mu_m'=\mu_m+\Delta\mu_m$. The parameter that dictates the displacement between the two measurements is:

$$\mu_m' \times \rho' \times l - \mu_m \times \rho \times l = \mu_m \times \Delta\rho \times l \times \Delta\mu_m \times (\rho+\Delta\rho) \times l \quad (13)$$

The first term on the right hand side of equation (13) is a simple density change $\Delta\rho$ along the spine on which the first measurement point is located. The second term represents a displacement on a rib of density $\rho'$ due to compositional changes. The difference between the two points can be further separated into displacements along one or more ribs with the same density. To simplify, it may be assumed that the compositional change does not involve a change in $R_O$. The second term in equation (13) therefore incorporates changes in $w_I$ and $R_H$. Even though $R_H$ and $\rho'$ remain constants for compositional changes along the impurity rib, $w_H$ and $w_C$ do change with $\Delta w_I$:

$$w'_I = w_I + \Delta w_I \quad (14a)$$

$$w'_H = w_C + \Delta w_{H,I} = w_H - \alpha \times \Delta w_I \quad (14b)$$

$$w'_C = w_C + \Delta w_{C,I} = w_C - \beta \times \Delta w_I \quad (14c)$$

$$\alpha + \beta = 1 \quad (14d)$$

$$w'_H / w'_C = w_H / w_C = R_H \quad (14e)$$

The subscript I indicates that the changes are along the impurity rib.

From equations (14a)–(14e) it follows that $$\alpha = R_H/(1+R_H) = w_H/(w_C+w_H) \quad (15a)$$

$$\beta = 1/(1+R_H) = w_C/(w_C+w_H) \quad (15b)$$

$$(\Delta\mu_m)_I = \mu'_m - \mu_m = \Delta w_I (\mu_{m,I} - \alpha\mu_{m,H} - \beta\mu_{m,C}) \quad (15c)$$

Typical values for $\alpha$ and $\beta$ are approximately 0.1 and less than approximately 1 respectively. The parameter describing the displacement along an impurity rib with given $\rho'$, $R_H$ must therefore have the form:

$$(\Delta\mu_m)_I \times \rho' \times l = \Delta w_I (\mu_{m,I} - \alpha\mu_{m,H} - \beta_{m,C}) \times \rho' \times l \quad (16a)$$

In the low energy window where $\mu_{m,I} \gg \alpha\mu_{m,H} + \beta\mu_{m,C}$, equation (16a) simplifies to $$(\Delta\mu_m)_I \times \rho' \times l \cong \Delta w_I \mu_{m,I} \quad (16b)$$

for all impurities. In the high energy window, however, equation (16a) should be used for sulfur and NaCl. This effect counteracts on the sulfur and NaCl Compton contributions to the cross section of the impurities in the high energy window, and brings the responses of sulfur and NaCl closer to those of heavier impurities.

For a displacement along a C—H rib, where $\rho$ and $w_I$ remain unchanged, the following relation is satisfied:

$$\Delta w_{C,R} + \Delta w_{H,R} = 0 \quad (17)$$

The subscript R identifies changes to be associated with change in $R_H$ only. The parameter that describes displacement with given $\rho$ and $w_I$ along a C—H rib therefore has the following form:

$$(\Delta\mu_m)_R \times \rho' \times l = (\mu_{m,H} \Delta w_{H,R} + \mu_{m,C} \Delta w_{C,R}) = (\mu_{m,H} - \mu_{m,C}) \times \Delta w_{H,R} \times \rho' \times l \quad (18)$$

Thus, the vertical displacement is proportional to change in hydrogen weight fraction.

By definition $\Delta w_I = w_I$ if the displacement on the impurity rib is measured from the base spine. Each point on the cross plot provides an indication of density and Pe expressed in terms of the quantity $w_I(\mu_{m,I} - \alpha\mu_{m,H} - \beta\mu_{m,C})$. Because of its strong Z dependence, the $\mu_{m,I}$ of a downhole fluid sample is often dominated by a single element that is present only in the (mud) filtrate or formation fluid, but not both.

Figure 6:
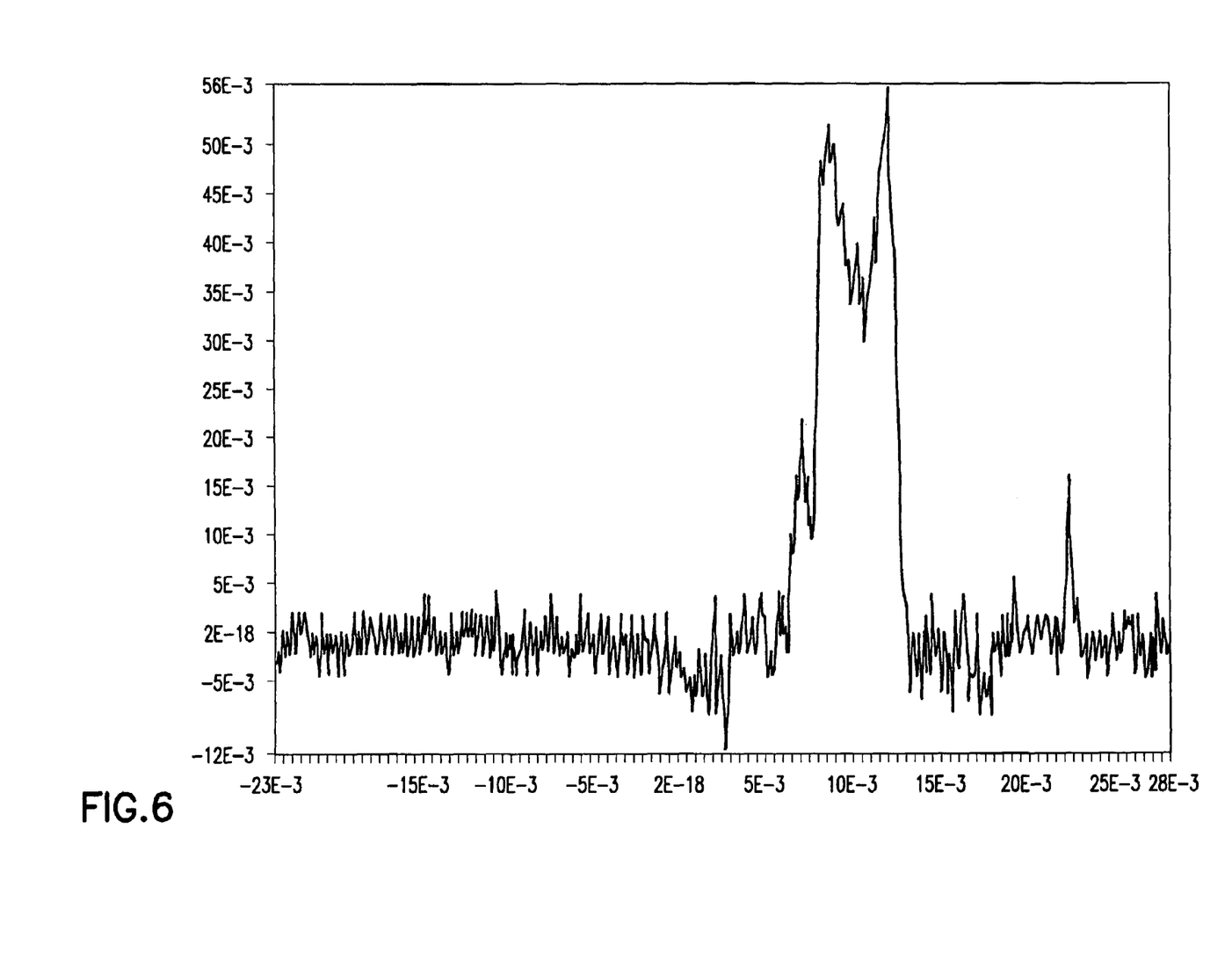
FIG. 6 is a graph showing changes in the attenuation over time due to sanding.

The change over time in the photoelectric absorption due to impurities may be useful for detecting a changeover from the sampling of mud filtrate to the sampling of formation fluids. Similarly, a sudden change in the attenuation can be useful in the detection of foreign substances such as bubbles or sand in the sample. Bubbles can be identified because they reduce attenuation. Sand, on the other hand, will increase attenuation. In particular, while not dissolved in the sample, sand particles can still be considered "impurities". Sand particles are considerably larger than clay particles, and while preferably screened in the borehole tool, can still traverse the screen at a size of several hundred microns in diameter. Even a single grain of sand of e.g., 450 microns in diameter will cause a significant increase in X-ray attenuation through the flow line. The change in attenuation as a result of photoelectric absorption and Compton scattering due to sand particles is seen in FIG. 6 where the y-axis is the attenuation level and the x-axis is time.

Because sand particles flow with the fluid, in order to detect a sanding situation, the source intensity should be sufficient to take a "snap shot" of sand particles passing through the detection volume. Traveling at 10 cm/sec, a single grain of sand will cover a distance of 1 mm in 10 ms. Thus, a sampling time on the order of 1 ms may be required. Such a short sampling time suggests the desirability of a high peak current (0.1–1 mA) X-ray tube. Since it is not necessary to measure density and sanding in the same pulse, the X-ray flux can be reduced for accurate density measurements. In fact, the sanding measurements can be used to gate the density measurements; i.e., when sand is found in the sample, density measurements are not made.

According to the invention, there are two preferred manners of detecting the passage of sand particles: non-imaging and imaging techniques. In the former situation, a single volume detector is used to detect the sudden increase in attenuation when one or more sand particles pass by. For optimal sensitivity in this case, both the detection volume and beam spot on target should be as small as possible. In the latter situation, sand particles can be imaged with an imaging detector. In this case, a small detection volume is not necessary, but a tight beam spot (preferably similar to the size of the smaller sand particles which are being detected) is desirable as it directly affects the sharpness and contrast of the image. It is also desirable to place the X-ray target as close to the fluid as possible in order to maximize the image amplification factor.

It should be appreciated that the sanding information which can be obtained by measuring the change in attenuation over time can be used to detect the onset of sand release from the formation. The sand release information can be correlated to information regarding flow rate in order to determine the sand-free draw-down pressure. Knowing this information allows producers to make sound production decisions. For example, in certain market segments such as shallow water on the continental shelf, it may be more economical to reduce production rates than to install gravel packing.

According to another aspect of the invention, in finding the stock tank oil density, account may be taken of methane which is dissolved in the downhole oil. Using known techniques such as disclosed in U.S. Pat. No. 5,939,717 to Mullins, which is hereby incorporated by reference herein in its entirety, the gas-oil ratio (or C to H ratio) for the downhole oil is found using the optical detectors shown in FIG. 2, and that information is used in conjunction with the determination of the mass and/or electron density of the downhole sample to provide a corrected density answer.

There have been described and illustrated herein several embodiments of apparatus and methods of investigating downhole fluid samples utilizing nuclear electromagnetic irradiation. While particular embodiments of the invention have been described, it is not intended that the invention be limited thereto, as it is intended that the invention be as broad in scope as the art will allow and that the specification be read likewise. Thus, while a system utilizing both an X-ray source and a gamma ray source was described, it will be appreciated that various aspects of the invention can be carried out using only one of the source. Also, while a particular X-ray source was described and particular energy windows were described with reference to the X-ray source and detector, it will be appreciate that different energy windows could be utilized. The different energy windows can be broader or narrower, can include lower and/or higher energies, and can even overlap, although such is not particularly desirable. In addition, additional energy windows can be used to provide an over-determined system which can be used to invalidate other determinations, or the additional energy windows can be used to find additional information regarding impurities in the collected sample. Further, while a particular fluid sampling system and optical analysis system has been described, other sampling and optical analysis systems could be utilized. In fact, the optical analysis system, while useful, is not required in the apparatus and methods of the invention. It will therefore be appreciated by those skilled in the art that yet other modifications could be made to the provided invention without deviating from its spirit and scope as claimed.

We claim:

1. A method of investigating an oil sample flowing through a tube downhole, comprising:
   a) irradiating the oil sample downhole with nuclear electromagnetic radiation using a radiation source external the tube;
   b) measuring the attenuation of the radiation; and
   c) determining an indication of at least one of the electron density and mass density of the oil sample by relating the attenuation to the at least one of the electron density and mass density.

2. A method according to claim 1, wherein:
said nuclear electromagnetic radiation is gamma ray radiation having an energy of at least 100 keV.

3. A method according to claim 1, wherein:
said nuclear electromagnetic radiation is X-ray radiation having a plurality of energies.

4. A method according to claim 3, wherein:
said plurality of energies comprise energies from at least 10 keV to 60 keV.

5. A method according to claim 4, wherein:
said measuring the attenuation is conducted in at least two energy windows.

6. A method of investigating an oil sample flowing through a tube downhole, comprising:
   a) irradiating the oil sample downhole with nuclear electromagnetic radiation using a radiation source external the tube; and
   b) measuring the attenuation of the radiation in at least two energy windows; and
   c) determining an indication of at least one of the electron density and mass density of the oil sample by relating the attenuation to the at least one of the electron density and mass density, wherein,
   said at least two energy windows comprise two discrete energy windows including a first energy window where Compton scattering dominates said attenuation, and a second energy window where attenuation is dominated by both Compton scattering and photoelectric effect.

7. A method according to claim 6, wherein:
said first energy window is from approximately 50 keV to approximately 60 keV, and said second energy window is from approximately 20 keV to approximately 24 keV.

8. A method according to claim 6, further comprising:
   d) determining an indication of impurities in said oil sample by determining how much of said attenuation is due to said photoelectric effect, and relating said photoelectric effect to said impurities.

9. A method according to claim 8, wherein:
said indication of impurities is an indication of sulfur content.

10. A method according to claim 6, further comprising:
providing a cross-plot with information related to said first energy window representing a first axis of said cross-plot and information related to said second energy window representing a second axis of said cross-plot, said cross-plot including first sets of lines representing substantially pure hydrocarbons at different densities, and second sets of lines extending from said first sets of lines and representing compositional changes relative to said pure hydrocarbon lines.

11. A method according to claim 10, further comprising:
utilizing said attenuation information to generate a point which lies in said cross-plot, and utilizing said point in said cross-plot to characterize said oil sample.

12. A method according to claim 1, further comprising:
said determining includes determining another indication of one of (i) the amount of methane, (ii) the gas to oil ratio of said sample, and (iii) the carbon to hydrogen ratio of said sample, and using said another indication in said determining said one of the electron density and mass density.

13. A method according to claim 1, wherein:
said nuclear electromagnetic radiation has a source intensity ($I_0(E)$), where E is an indication of energy,
said measuring the attenuation of the radiation comprises measuring an intensity ($I(E)$) of a received signal after said nuclear electromagnetic radiation has passed through said sample, and
said determining an indication of at least one of the electron density and mass density of the oil sample comprises finding at least one of said electron density and mass density substantially according to $I(E)=I_0(E) e^{-\mu_m(E)\times\rho\times l}$, where l is the path length of said oil sample through which said radiation has passed, $\mu_m$ is the mass attenuation coefficient of said oil sample, and $\rho$ is said mass density of said oil sample.

14. A method according to claim 13, wherein:
said mass attenuation coefficient is defined according to $$\mu_m(E) = \frac{1}{\rho}\sum n_i \sigma_{C,i}(E) + \frac{1}{\rho}\sum n_i \rho_{Pe,i}(E),$$

where i is an index of the chemical elements in said oil sample, $\sigma_{Pei}$ is the photoelectric effect contribution to an electronic cross section of said oil sample and $\sigma_{Ci}$ is the Compton scattering contribution to said electronic cross section.

15. A method according to claim 14, wherein:
said photoelectric effect contribution is defined according to $Pe\times\rho\times F_{Pe}(E)$, where Pe is the Pe factor of said oil sample, $\rho$ is the mass density, and $F_{Pe}$ is a function of the photon energy E, and
said Compton scattering contribution is defined according to $\rho\times(1+w_H)F_C(E)$ where $w_H$ is the hydrogen weight fraction of said oil sample, and $F_C$ is a function which decreases with E but at a much slower rate than $F_{Pe}$.

16. A method of investigating an oil sample flowing through a tube downhole, comprising:
a) irradiating the oil sample downhole with X-ray radiation at a plurality of energies using an X-ray radiation source external the tube;
b) measuring the attenuation of the radiation at at least two of said plurality of energies; and
c) determining an indication of an impurity in said oil sample by relating the attenuation at said at least two of said plurality of energies to said impurity.

17. A method according to claim 16, wherein:
said plurality of energies comprise energies from at least 10 keV to 60 keV.

18. A method according to claim 17, wherein:
said measuring the attenuation is conducted in at least two energy windows.

19. A method of investigating an oil sample flowing through a tube downhole, comprising:
a) irradiating the oil sample downhole using a radiation source external the tube with X-ray radiation at a plurality of energies;
b) measuring the attenuation of the radiation at at least two of said plurality of energies; and
c) determining an indication of an impurity in said oil sample by relating the attenuation at said at least two of said plurality of energies to said impurity, wherein said at least two of said plurality of energies includes a first energy where Compton scattering dominates said attenuation, and a second energy where attenuation is dominated by both Compton scattering and photoelectric effect.

20. A method according to claim 19, wherein:
said measuring at at least two of said plurality of energies is a measuring in at least a first energy window and a second energy window,
said first energy window is from approximately 50 keV to approximately 60 keV, and said second energy window is from approximately 20 keV to approximately 24 keV.

21. A method according to claim 19, wherein:
said determining an indication of impurity comprises determining how much of said attenuation is due to said photoelectric effect, and relating said photoelectric effect to said impurity.

22. A method according to claim 21, wherein:
said indication of impurity is an indication of sulfur content.

23. A method of monitoring a fluid flowing downhole in a tube of a borehole tool, comprising:
a) irradiating the fluid downhole in the tube of the borehole tool with X-ray radiation at at least one energy;
b) measuring the attenuation of the radiation at at least said one energy;
c) repeating a) and b) over time for different samples of said flowing fluid; and
d) monitoring changes in said attenuation.

24. A method according to claim 23, wherein:
said monitoring comprises determining that sand particles are found in a particular sample.

25. A method according to claim 23, wherein:
said monitoring comprises determining that gas bubbles are found in a particular sample.

26. An apparatus for investigating fluids in an earth formation traversed by a borehole, said apparatus extending in said borehole and comprising:
a) a fluid admitting assembly which establishes fluid communication with and obtains the fluids from the earth formation;
b) a fluid flow path fluidly coupled to said fluid admitting assembly; and
c) a nuclear electromagnetic radiation system which irradiates the fluid in said fluid flow path with radiation and measures received radiation after the fluid in the fluid flow path attenuates the radiation, said nuclear electromagnetic radiation system including at least one of (i) an X-ray source and X-ray detector, and (ii) a gamma-ray source and gamma-ray detector.

27. An apparatus according to claim 26, further comprising:
d) a processor coupled to said nuclear electromagnetic radiation system which determines an indication of at least one of the electron density and mass density of the fluid by relating the attenuation to the electron density or mass density of the fluid.

28. An apparatus according to claim 26, wherein:
said at least one of an X-ray source and X-ray detector, and a gamma-ray source and gamma-ray detector includes a gamma-ray source having an energy of at least 100 keV.

29. An apparatus according to claim 26, wherein:
said at least one of an X-ray source and X-ray detector, and a gamma-ray source and gamma-ray detector includes said gamma-ray source and said gamma-ray detector and said X-ray source and said X-ray detector.

30. An apparatus according to claim 26, further comprising:
a plurality of fluid collecting chambers coupled to said fluid flow path.

31. An apparatus according to claim 26, wherein:
said fluid flow path contains at least one low-Z material window, and said X-ray source and X-ray detector are located adjacent said low-Z material window.

32. An apparatus according to claim 31, wherein:
said X-ray source generates a continuous spectrum of X-rays at least from an energy of 10 keV up to at least an energy of approximately 60 keV.

33. An apparatus according to claim 32, wherein:
said X-ray detector is an NaI scintillator.

34. An apparatus according to claim 32, wherein:
said X-ray detector detects attenuation in at least two energy windows.

35. An apparatus according to claim 34, wherein:
said at least two energy windows comprise two discrete energy windows including a first energy window where Compton scattering dominates said attenuation, and a second energy window where attenuation is dominated by both Compton scattering and photoelectric effect.

36. An apparatus according to claim 35, wherein:
said first energy window is from approximately 50 keV to approximately 60 keV, and said second energy window is from approximately 20 keV to approximately 24 keV.

37. An apparatus according to claim 34, wherein said fluid in said fluid flow path comprises oil, said apparatus further comprising:
d) a processor coupled to said nuclear electromagnetic radiation system which determines an indication of impurities in said oil by determining how much of said attenuation is due to a photoelectric effect, and relating said photoelectric effect to said impurities.

38. An apparatus according to claim 37, wherein:
said indication of impurities is an indication of sulfur content of said oil.

39. An apparatus according to claim 35, said apparatus further comprising:
d) means for generating a point which lies in a cross-plot from which said fluid may be characterized, said cross-plot having a first axis related to said first energy window and a second axis related to said second energy window, said cross-plot including first sets of lines representing substantially pure hydrocarbons at different densities, and second sets of lines extending from said first sets of lines and representing compositional changes relative to said pure hydrocarbon lines.

40. An apparatus according to claim 27, wherein:
said fluid in said fluid flow path comprises an oil sample,
said X-ray source or said gamma-ray source has a source intensity ($I_0(E)$), where E is an indication of energy,
said X-ray detector or said gamma-ray detector measures an intensity ($I(E)$) of a received signal after nuclear electromagnetic radiation from said source has passed through said oil sample, and
said processor determines said indication of at least one of the electron density and mass density of the oil sample by finding at least one of said electron density and mass density substantially according to $I(E)=I_0(E)e^{-\mu_m(E)\times\rho\times l}$, where l is the path length of said oil sample through which said irradiation has passed, $\mu_m$ is the mass attenuation coefficient of said oil sample, and $\rho$ is said mass density of said oil sample.

41. An apparatus according to claim 40, wherein:
said mass attenuation coefficient is defined according to $$\mu_m(E) = \frac{1}{\rho}\sum n_i \sigma_{C,i}(E) + \frac{1}{\rho}\sum n_i \rho_{Pe,i}(E),$$

where i is an index of the chemical elements in said oil sample, $\sigma_{Pei}$ is the photoelectric effect contribution to an electronic cross section of said oil sample and $\sigma_{Ci}$ is the Compton scattering contribution to said electronic cross section.

42. An apparatus according to claim 41, wherein:
said photoelectric effect contribution is defined according to $Pe \times \rho \times F_{Pe}(E)$, where Pe is the Pe factor of said oil sample, $\rho$ is the mass density, and $F_{Pe}$ is a function of the photon energy E, and
said Compton scattering contribution is defined according to $\rho \times (1+w_H) F_C(E)$ where $w_H$ is the hydrogen weight fraction of said oil sample, and $F_C$ is a function which decreases with E but at a much slower rate than $F_{Pe}$.

43. An apparatus according to claim 34, wherein said fluid in said flow path comprises an oil sample, said apparatus further comprising:
d) a processor coupled to said nuclear electromagnetic radiation system which determines an indication of an impurity in said oil sample by relating the attenuation at said at least two energy windows to said impurity.

44. An apparatus according to claim 43, wherein:
said at least two energy windows comprise two discrete energy windows including a first energy window where Compton scattering dominates said attenuation, and a second energy window where attenuation is dominated by both Compton scattering and photoelectric effect.

45. An apparatus according to claim 44, wherein:
said first energy window is from approximately 50 keV to approximately 60 keV, and said second energy window is from approximately 20 keV to approximately 24 keV.

46. An apparatus according to claim 43, wherein:
said processor determines an indication of an impurity by determining how much of said attenuation is due to a photoelectric effect, and relating said photoelectric effect to said impurity.

47. An apparatus according to claim 46, wherein:
said indication of impurity is an indication of sulfur content of said oil sample.

48. An apparatus according to claim 26, wherein:
said X-ray source radiates a plurality of samples of said fluid in said fluid flow path over time, and said X-ray detector measures received radiation over time for said plurality of samples.

49. An apparatus according to claim 48, further comprising:
d) a processor coupled to said nuclear electromagnetic radiation system which monitors substantial changes in said received radiation over time.

50. An apparatus according to claim 49, wherein:
said processor determines that sand particles are found in a particular sample when a sharp decrease in radiation is received over time.

51. An apparatus according to claim 49, wherein:
said processor determines that gas bubbles are found in a particular sample when a sharp increase in radiation is received over time.

52. A method of investigating an oil sample flowing through a tube downhole, comprising:
  a) irradiating the oil sample downhole with nuclear electromagnetic radiation using a radiation source external the tube;
  b) measuring the attenuation of the radiation; and
  c) determining an indication of at least one of the electron density and mass density of the oil sample by relating the attenuation to the at least one of the electron density and mass density such that said attenuation always increases when said at least one of the electron density and mass density increases.

53. A method according to claim 52, wherein:
said nuclear electromagnetic radiation is gamma ray radiation having an energy of at least 100 keV.

54. A method according to claim 52, wherein:
said nuclear electromagnetic radiation is X-ray radiation having a plurality of energies.

55. A method according to claim 54, wherein:
said plurality of energies comprise energies from at least 10 keV to 60 keV.

56. A method according to claim 55, wherein:
said measuring the attenuation is conducted in at least two energy windows.

57. A method of investigating an oil sample flowing through a tube downhole, comprising:
  a) irradiating the oil sample downhole with X-ray radiation at a plurality of energies using a radiation source external the tube;
  b) measuring the attenuation of the radiation at at least two of said plurality of energies such that the attenuation of the radiation at said at least two energies always increases when a density of the oil sample increases; and
  c) determining an indication of an impurity in said oil sample by relating the attenuation at said at least two of said plurality of energies to said impurity.

58. A method according to claim 57, wherein:
said plurality of energies comprise energies from at least 10 keV to 60 keV.

59. A method according to claim 58, wherein:
said measuring the attenuation is conducted in at least two energy windows.

60. A method of monitoring a fluid flowing downhole in a tube of a borehole tool, comprising:
  a) irradiating the fluid downhole in the tube of the borehole tool with X-ray radiation at at least one energy;
  b) measuring the attenuation of the radiation at at least said one energy such that the attenuation always increases as a density of the fluid increases;
  c) repeating a) and b) over time for different samples of said flowing fluid; and
  d) monitoring changes in the attenuation.

61. A method according to claim 60, wherein:
said monitoring comprises determining that sand particles are found in a particular sample.

62. A method according to claim 60, wherein:
said monitoring comprises determining that gas bubbles are found in a particular sample.

* * * * *